United States Patent [19]

Winblad

[11] 4,335,795
[45] Jun. 22, 1982

[54] DRIVING CONTROLS FOR A VEHICLE, PARTICULARLY A TRACKED COMBAT VEHICLE

[75] Inventor: Nils Winblad, Karlskoga, Sweden
[73] Assignee: Aktiebolaget Bofors, Bofors, Sweden
[21] Appl. No.: 109,725
[22] Filed: Jan. 4, 1980
[30] Foreign Application Priority Data
  Jan. 12, 1979 [SE] Sweden ............................... 7900278
[51] Int. Cl.³ .............................................. B62D 11/00
[52] U.S. Cl. ..................................... 180/6.2; 74/665 L
[58] Field of Search ............... 180/6.2, 6.7; 74/665 L, 74/665 M, 665 N, 675

[56] References Cited
U.S. PATENT DOCUMENTS
  2,722,986 11/1955 Baldine ................................. 180/6.7

Primary Examiner—Joseph F. Peters, Jr.
Assistant Examiner—Ross Weaver
Attorney, Agent, or Firm—Pollock, Vande Sande & Priddy

[57] ABSTRACT

In a vehicle, driving controls are utilized for control of throttle, brakes, and equipment which control a difference in speed between the drive wheels or track units of the vehicle. The driving controls comprise two foot pedals which can be actuated individually, and a differential unit which can be controlled by these. Via two means from the differential unit, a sum signal and a difference signal, respectively, is obtained from the actuation situation of the foot pedals. The acceleration and braking force is controlled with the sum signal, and the difference in speed between the drive means of the vehicle is determined by the difference signal.

10 Claims, 7 Drawing Figures

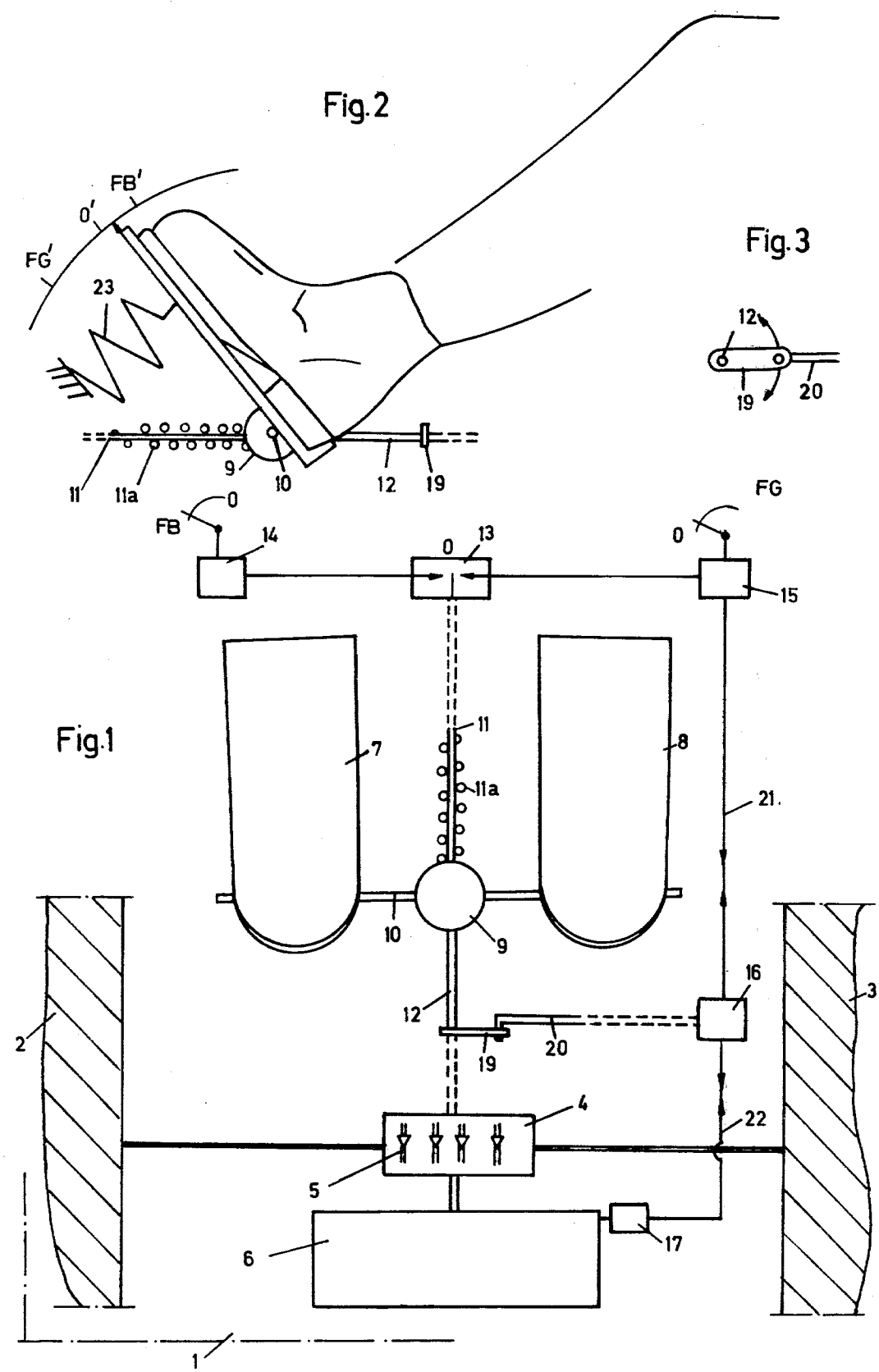

DRIVING CONTROLS FOR A VEHICLE, PARTICULARLY A TRACKED COMBAT VEHICLE

TECHNICAL FIELD

The present invention relates to driving controls intended particularly for a tracked combat vehicle which comprise means for control of throttle, brakes, and equipment by means of which a difference in speed of drive means located on either side of the vehicle can be achieved. The vehicle is then steered with the aid of said difference in speed. At a difference in speed of zero, the vehicle normally goes straight ahead, and said drive means can consist of, for example, track units on either side of the vehicle. The vehicle is also assumed to have automatic transmission within its entire range of speeds, arranged in a way which is known in itself.

BACKGROUND ART

For vehicles of the kind in question, it is previously known to utilize driving controls which require hand operation to a greater or lesser extent.

DISCLOSURE OF INVENTION

THE TECHNICAL PROBLEM

For e.g. combat vehicles it would be a great advantage if the driver of the vehicle while driving could participate in, for example, observation duty and service of the weapon with the main direction of fire quite close to the driving direction. On the condition that there is good vehicle, weapon, and sighting equipment stabilization, and also ergonomically well adapted foot controls for all driving functions, it would be possible to fulfill this desire. The driver could then, with hand controls, operate an observation cupola on the vehicle and a weapon connected thereto with limited aiming possibilities, while the driving could be performed entirely with foot controls.

In this connection, it is also essential that the foot controls have a distinct and easily defined actuation pattern, which is easy for the driver to learn. It is also important that the driving controls have a technically uncomplicated design.

THE SOLUTION

In accordance with the concept of the invention, two foot pedals which can be actuated individually and a differential unit which can be controlled by these should be utilized.

Said differential unit is then arranged to emit sum and difference signals, respectively, depending upon the actuation situation of the foot pedals. The ordinary throttle and brakes of the vehicle are controlled with said sum signal, while the difference signal controls the equipment which determines the difference in speed between the drive means on either side of the vehicle.

In further developments of the concept of the invention, said difference signal also controls an extra throttle which gives additional speed to the ordinary acceleration. Said further developments also comprise an arrangement for the foot pedals which is advantageous from the point of view of design.

The feature which is mainly characteristic for the driving controls according to the invention, however, will be noted from the characterizing part of the following claim 1.

ADVANTAGES

Through the solution proposed, the main purpose of the present invention is primarily achieved, viz. to relieve the driver's hands of all work concerned with the driving, with the exception of measures to be taken in connection with the starting and stopping of the vehicle. In said further developments, facilitative driving properties and the simplicity sought in the operation and the design of the driving controls are obtained.

BRIEF DESCRIPTION OF DRAWINGS

An embodiment proposed at present of driving controls which have the characteristics significant for the invention will be described in the following, with reference to the accompanying drawings, in which:

FIG. 1 shows a horizontal view of the principle components of the present invention employed in a tracked combat vehicle;

FIG. 2 shows a side view of a foot pedal according to FIG. 1;

FIG. 3 shows a detailed horizontal view of a components according to FIG. 1;

BEST MODE OF CARRYING OUT THE INVENTION

Figure 4:
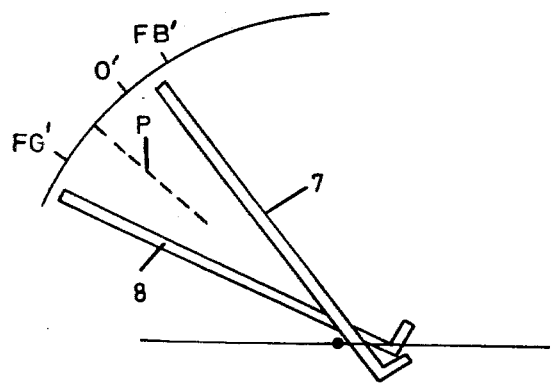
FIG. 4 shows from the side first actuation situations for the foot pedals according to FIG. 1.

In FIG. 1, a tracked combat vehicle is designated by the numeral 1, and the drive means of the vehicle in the form of track units arranged on either side of the vehicle by 2 and 3. The combat vehicle is known in itself, and is of the type for which steering takes place with the aid of a difference in speed generated between the track units.

This difference in speed is variable, and can be achieved with equipment which is known in itself, which in FIG. 1 is indicated by 4. Said equipment can then comprise a superimposed gear. The drive in the vehicle is achieved by means of hydraulic units which can be controlled via pilot valves, symbolized by 5, which can be actuated by the equipment 4. The engine in the vehicle, which can consist of a petrol, diesel, or turbine engine, is designated by 6. The vehicle is also assumed to be of the type which has automatic transmission within the entire range of speeds.

The new controls comprise two foot pedals 7 and 8 and a differential gear 9 which can be of a type which is known in itself. The foot pedals are supported on a transversal shaft 10, and can be actuated individually to different angular positions. In their respective angular positions they achieve individual control of the differential gear. This has first and second output means in the form of a universal driving shaft 11 and a differential shaft 12. At the universal driving shaft there is arranged a return spring 11a of the torsion type. In certain cases, it can be an advantage to replace the return spring with two separate return springs, one for each pedal.

The differential gear is arranged to give a torsional angle on its universal driving shaft which constitutes the sum of the actuation situation of the pedals, i.e. the sum signal 0 is obtained when both pedals are unactuated, the sum signal 1 is obtained if, for example, both pedals are actuated half way, or if one pedal is unactuated and one is fully actuated, etc., and the sum signal 2 is obtained if both pedals are fully actuated, etc.

The differential gear is also arranged to give a torsional angle on its differential shaft which constitutes the difference in the actuation situation of the pedals. Thus, the difference signal 1 can be obtained when one of the foot pedals is fully actuated and the other is entirely unactuated. When the actuation situation of the pedals is identical, the difference signal 0 is obtained, etc.

Said universal driving shaft, in dependence on its torsional angle, controls means 13 which determine the setting of the throttle and brakes in the vehicle. In FIG. 1, for the sake of clearness, said means 13 have been drawn to control brake circuits 14 and the ordinary throttle 15 of the vehicle. The means 13 are then arranged to control the brake circuits within the range from Full Braking to 0. In the position FB the brakes are fully applied on all braked wheels of the vehicle. Within the braking range, the braking force decreases, for example, linearly to position 0 when the brakes are released from the braked wheels. From position 0 the means 13, in dependence on the deflection from the universal driving shaft can change over to actuate throttle circuits 15 which have the limit positions 0 and FG, within which the throttle is linearly deflected with full acceleration in position FG and 0 acceleration in position 0. The acceleration function can be linear, stepwise, etc. within the actuation range. Said means 13, 14 and 15 can be made mechanical or electronic, in ways which are known in themselves.

The differential shaft 12 on the gear, in dependence on its torsional angle, controls the equipment 4 and therewith the magnitude of the difference in speed between the drive means 2 and 3.

To the differential shaft there is also connected an extra throttle, the indication or deflection of which at the steering is added to the indication or deflection of the ordinary throttle 15 which is connected to the universal driving shaft. This additional acceleration is adapted in such a way that turning of the vehicle can take place even when the vehicle is braked and the throttle 15 is set at idling speed. The additional controls reduce the total deflection space (angular space) required in the set of pedals. In the example of the embodiment shown, the additional controls 16 are connected via speed controls 17 for the engine 6, which controls 17 ensure the correct acceleration function for the type of engine in question. It is particularly advantageous to utilize the controls 17 for turbine and diesel engines, for which sudden changes of speed would otherwise be critical.

The transmission from the differential shaft 12 to the controls 16, as well as the transmission from this to the engine, can be carried out mechanically and/or electronically. The summation of the acceleration deflections in 15 and 16 can also be carried out mechanically and/or electronically. In FIG. 1, a mechanical transmission device for transmission of the movement from the differential shaft 12 to the additional throttle 16 is shown by a part 19 and an arm 20, the relations of which to each other are shown in FIG. 3. The part 19 is fixed to the shaft 12 and turns with this in the direction of the arrows. The arm 20 is movably supported in the part 19 in a supporting hole, and when the part turns, a longitudinal displacement movement arises in the arm 20 which is utilized in the throttle 16. The connection between the means 15, 16 and 17 and the engine 6 is symbolized by 21, 22.

FIG. 2 is intended to show the different actuation situations of the respective foot pedal, which is tiltably supported with the shaft 10 at its lower parts. The pedal is spring loaded by means of a spring 23 with an initial position at the full braking position FB'. The pedal can be actuated against the spring force in the spring 23 towards a full throttle position FG'. An intermediate position 0' forms the neutral position. Said position FB' corresponds to the position FB in the above-mentioned situation, and in the same way FG' and 0' to the position FG and 0.

Figure 5:
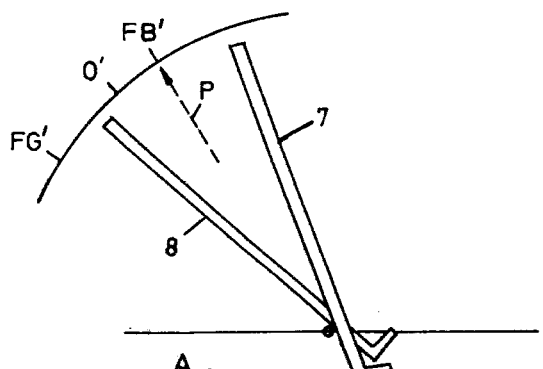
FIG. 5 shows from the side second actuation situations for the foot pedals according to FIG. 1.

FIGS. 4 and 5 are intended to illustrate various actuation situations of the pedals 7 and 8 for achieving various driving maneuvers.

In FIG. 4, the pedal 7 is set between the FB' and the 0' positions and the pedal 8 in a position past position FG', so that an arrow which divides the angle between the pedals into two equal parts is set in a position between the FG' and the 0' positions. The ordinary throttle 15 is then deflected via the universal driving shaft so that about half speed is obtained on the throttle 15. Via the differential shaft, the throttle 16 also is deflected, which then causes such an addition to said half speed on 15 that full speed is obtained on the engine 6. At the same time, the deflection on the differential shaft gives rise to a maximum difference in speed between the track units 2 and 3, which involves that the vehicle makes a so-called full left turn since the right driving unit 3 is given the higher speed when the right pedal is depressed.

In the driving case according to FIG. 5, the left pedal 7 is set in the initial position past position FB', while the right pedal is set in an acceleration position somewhat past the 0' position. The arrow P will then be set at position FB'. The throttle 15 then gives somewhat more than 0, while the throttle 16 also in this case gives half speed. In this case, the left turn is thus obtained with about half throttle and full braking. For corresponding right turns, the actuation situations of pedals 7 and 8 are reversed.

If both pedals are depressed to the same extent, an acceleration is obtained via the throttle 15 which is dependent upon the degree of depression of the pedals. Various degrees of turning, acceleration, and braking can be obtained through different actuation situations in accordance with what is described above.

Figure 6:
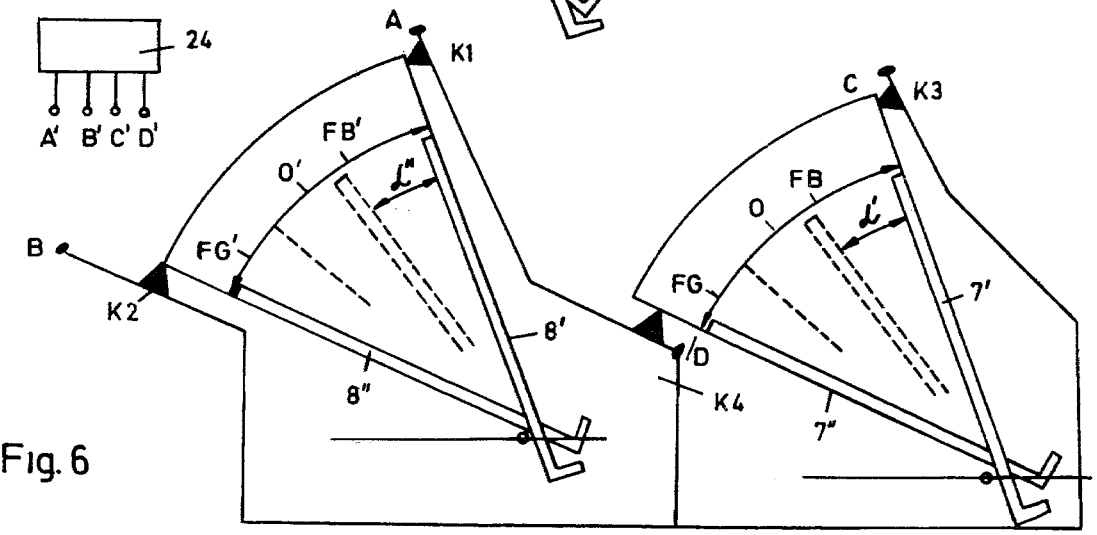
FIG. 6 shows from the side contact devices which can be used at the foot pedals according to FIG. 1; and, FIG. 7 shows a horizontal view of a modified embodiment of the driving controls of the present invention.

The new driving controls are also suitable for use in vehicles with so-called clutch/brake function, which in FIG. 6 is symbolized by 24, which clutch/brake function is then controlled through contact devices $K_1$, $K_2$, $K_3$ and $K_4$ placed at the highest and lowest positions, respectively, of the pedals. In FIG. 6, the pedals 7 and 8 are shown individually, and said highest and lowest positions of the pedals are indicated by 7', 7", and 8', 8", respectively.

As described above, the pedals work against a spring loaded play past the upper position or the initial position, which play is indicated in the figure by $\alpha$ and $\alpha''$, respectively. Through this play, the pedals can simultaneously be each in their outer position, i.e. one of the pedals is entirely unactuated and the other is fully actuated, or vice versa, and the contact devices which in accordance with FIG. 6 are connected in series crosswise can actuate the clutch/brake controls 24 for turning either to the right or to the left. The clutch/brake controls 24, which are known in themselves, are connected to the connections indicated in FIG. 6 by A, B, C and D via the respective corresponding connections A', B', C' and D', respectively. In accordance with the above, the condition for the clutch/brake steering will thus be that one of the pedals is moved to its highest position at the same time as the other pedal is moved to the position for full acceleration.

Figure 7:
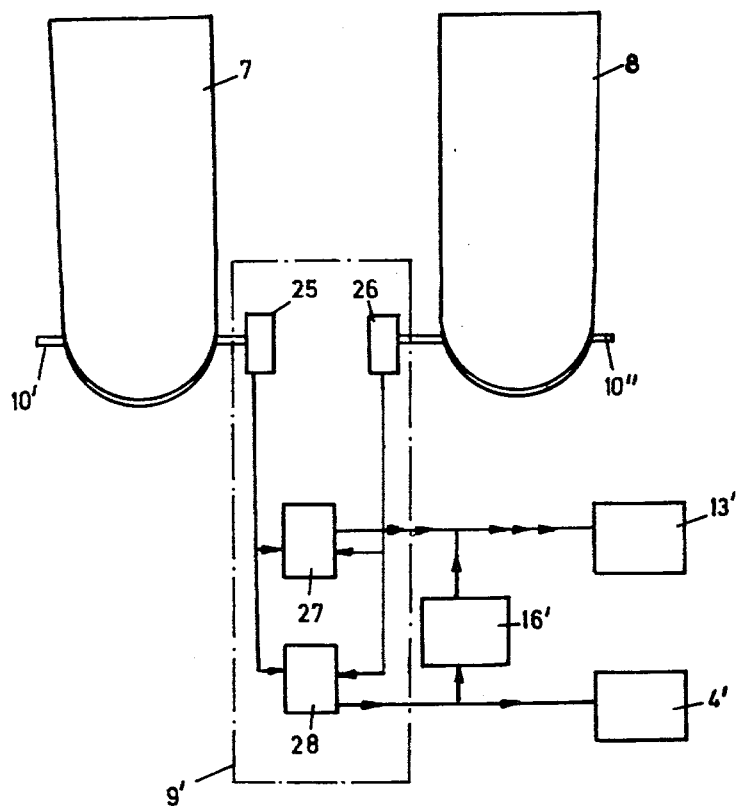

FIG. 7 shows a modified embodiment of the substantially mechanical design according to FIG. 1. In this case the differential gear has been replaced by a differential unit 9' which is built up electronically, which comprises a rotary potentiometer 25 and 26, respectively, synchros, etc. for each pedal 7, 8. The respective potentiometer or the like can be set by means of the rotary movement of the relevant pedal shaft 10', 10''. The rotary potentiometer is connected to a summation unit 27 and a subtraction unit 28. The means 27 and 28 can be of kinds which are known in themselves which respectively add or subtract two signals, and on their respective outputs emit output signals dependent on the summation and the subtraction. In accordance with what is described above, the summation unit controls a means 13' which determines the setting of acceleration and braking in the vehicle. The subtraction unit 28 controls the equipment 4', which determines the difference in speed between the track units of the vehicle in dependence on the difference signal. This signal is also connected to a reduction circuit 16', which achieves an additional signal which is added to the signal for the ordinary throttle, as in the embodiment described above.

The invention is not limited to the embodiment shown above as an example, but can be subject to modifications within the scope of the following claims. Thus the driving controls can be made according to the same principles in a hydraulic design, where the pedals can actuate pistons in pressure cylinders connected with each other and a receiving cylinder. The piston position of the receiving cylinder controls the acceleration while the difference in the pedal position controls the steering function.

Modifications are also conceivable as regards the articulation directions of the set of pedals. Thus, for instance, the pedals can be arranged so that they are displaceable forwards-rearwards for the steering functions, while the acceleration and braking control functions are retained according to the earlier model.

In the example of the embodiment, ½ FG has been chosen as the maximum acceleration of the controls 16, in order that it shall be easy to understand. Other values can, of course, be chosen, depending on the vehicle in question, and in the same way the actuation via the controls 16 need not be linear, but can be non-linear.

INDUSTRIAL APPLICABILITY

The new driving controls are easy to manufacture and install for use in vehicles of the kind in question. The parts comprised in the controls can be made of components which are conventional in themselves. As regards, for example, the differential gear described in the example of the embodiment, this can also be simplified, as the output signals from the gear do not require whole or a plurality of turns of the output shafts, but only parts of turns. In the vehicle, the invention provides for increased field of activity for the driver, which in general optimizes the relation functions/personnel in the vehicle in question.

I claim:

1. A driving control for a vehicle having drive means at each lateral side thereof, a throttle for controlling the acceleration of said drive means, brakes for said drive means, and gearing equipment for producing a difference in speed between the drive means on one side of the vehicle and the drive means on the other side of the vehicle, said driving control comprising:

a differential unit, and two individually actuated foot pedals connected to actuate said differential unit such that said differential unit produces a sum signal indicative of the present combined actuation situation of said pedals for controlling said throttle and said brake, and said differential unit also producing a difference signal indicative of the difference in the actuation situation of said pedals for controlling said gearing equipment.

2. Driving controls according to claim 1, wherein said difference signal emitted by the differential unit also controls an extra throttle, the deflection of which can be added to the deflection of the throttle actuated by the sum signal.

3. Driving controls according to claim 2, wherein the extra throttle coacts with speed controls for controlling the engine speed of the vehicle.

4. Driving controls according to claims 1, 2 or 3, wherein a respective pedal includes a full braking position (FB') and a full acceleration position (FG') and also an intermediate position (0') which formed a neutral position in which the acceleration and braking forces are zero, and that the full braking position is arranged in connection with the initial position, against which the pedal is spring loaded by means of a spring.

5. Driving controls according to claim 4, wherein a second output means is arranged for controlling said extra throttle to turn said vehicle when one of the pedals is set between the full braking position (FB') and the neutral position and the other pedal assumes a position past the full throttle position (FG').

6. Driving controls according to claim 1, wherein a maximum difference signal corresponds to the vehicle engine operating at approximately half speed.

7. Driving controls according to claim 1, wherein a full actuation of one of the two foot pedals without actuating the other pedal corresponds to the vehicle engine operating at approximately half speed.

8. Driving controls according to claim 4, wherein said respective pedal is mounted for movement past the full braking position to an outer position wherein said respective pedal coacts with contact device means connected in series crosswise for actuating clutch and, or brake controls for turning the vehicle either to the right or to the left.

9. Driving controls according to claim 1, wherein said differential unit comprises a differential gear connected to output universal driving and differential shafts to provide said summation and difference signals, respectively, with said signals corresponding to torsional angles of said shafts.

10. Driving controls according to claim 1, wherein said differential unit comprises two rotary potentiometers connected to each pedal, with a summation unit and a subtraction unit connected to the potentiometers.

* * * * *